US012786822B2

(12) United States Patent
Wang

(10) Patent No.: US 12,786,822 B2
(45) Date of Patent: Nov. 3, 2026

(54) CARRIER SWITCHING METHOD AND APPARATUS, SWITCHING CONFIGURATION METHOD AND APPARATUS, AND TERMINAL DEVICE AND NETWORK DEVICE

(71) Applicant: DATANG MOBILE COMMUNICATIONS EQUIPMENT CO., LTD., Beijing (CN)

(72) Inventor: Junwei Wang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 19/114,998

(22) PCT Filed: Sep. 19, 2023

(86) PCT No.: PCT/CN2023/119669

§ 371 (c)(1),
(2) Date: Mar. 25, 2025

(87) PCT Pub. No.: WO2024/067246

PCT Pub. Date: Apr. 4, 2024

(65) Prior Publication Data

US 2026/0006506 A1 Jan. 1, 2026

(30) Foreign Application Priority Data

Sep. 26, 2022 (CN) ......................... 202211177257.5

(51) Int. Cl.
*H04W 36/00* (2009.01)
*H04W 36/06* (2009.01)
*H04W 72/0453* (2023.01)

(52) U.S. Cl.
CPC ..... *H04W 36/00837* (2018.08); *H04W 36/06* (2013.01); *H04W 72/0453* (2013.01)

(58) Field of Classification Search
CPC ..... H04L 5/001; H04L 5/0023; H04L 5/0098; H04W 36/00837; H04W 36/06; H04W 36/0453; H04W 72/0453
See application file for complete search history.

(56) References Cited

U.S. PATENT DOCUMENTS 11,711,713 B2 * 7/2023 Babaei .................. H04L 1/1812 370/329
2022/0030479 A1 * 1/2022 Jain ......................... H04L 5/006
(Continued)

FOREIGN PATENT DOCUMENTS

CN 113922933 A 1/2022
CN 114466376 A 5/2022
(Continued)

OTHER PUBLICATIONS

Extended European Search Report issued Dec. 22, 2025 in European Application No. 23870478.7.
(Continued)

*Primary Examiner* — Khai M Nguyen
(74) *Attorney, Agent, or Firm* — Harness, Dickey & Pierce, P.L.C.

(57) ABSTRACT

The present disclosure relates to the technical field of communications. Provided are a carrier switching method and apparatus, a switching configuration method and apparatus, and a terminal device and a network device. The carrier switching method comprises, when the number of switching bands is greater than 2 and an antenna port configuration for a first carrier to be subjected to data transmission is a first antenna port configuration, determining a target switching case of the first antenna port configuration for the first carrier on the basis of first information, wherein the first antenna port configuration indicates one port; and executing carrier switching according to the target switching case, wherein the first information comprises, a
(Continued)

set of relationships between the first carrier and antenna port configurations, or first switching indication information.

14 Claims, 3 Drawing Sheets

(56) References Cited

U.S. PATENT DOCUMENTS

| | | | | |
|---|---|---|---|---|
| 2024/0250799 | A1* | 7/2024 | Rastegardoost | H04L 5/0094 |
| 2024/0284426 | A1* | 8/2024 | Liu | H04L 5/001 |
| 2025/0175296 | A1* | 5/2025 | Liu | H04L 5/0082 |
| 2025/0247832 | A1* | 7/2025 | Harada | H04W 72/0453 |

FOREIGN PATENT DOCUMENTS

| | | | | |
|---|---|---|---|---|
| EP | 4408093 | A1 * | 7/2024 | H04W 36/0083 |
| EP | 4220973 | B1 * | 2/2026 | H04B 7/0413 |
| WO | 2021/205419 | A1 | 10/2021 | |
| WO | 2022/076599 | A1 | 4/2022 | |
| WO | WO-2023212049 | A1 * | 11/2023 | H04L 5/0092 |

OTHER PUBLICATIONS

CATT, "Discussion on Multi-carrier UL Tx switching scheme," 3GPP TSG RAN WG1, #110, R1-2206383, Aug. 22, 2022.

Vivo, "Discussion on UL TX switching," 3GPP TSG RAN WG1 #109-e, R1-2203584, May 9, 2022.

International Search Report and Written Opinion issued Nov. 20, 2023 in international Application No. PCT/CN2023/119669.

CATT, "Discussion on Multi-carrier UL Tx switching scheme," 3GPP TSG RAN WG1 #109-e, R1-2205137, May 20, 2022.

* cited by examiner

CARRIER SWITCHING METHOD AND APPARATUS, SWITCHING CONFIGURATION METHOD AND APPARATUS, AND TERMINAL DEVICE AND NETWORK DEVICE

CROSS-REFERENCE TO RELATED APPLICATIONS

This application is a U.S. national application of a PCT application No. PCT/CN2023/119669, filed on Sep. 19, 2023 which claims the priority of Chinese Patent Application No. 202211177257.5 filed on Sep. 26, 2022, the disclosure of each of which is hereby incorporated by reference in their entirety.

TECHNICAL FIELD

The present disclosure relates to the field of communications technologies, and in particular, to a carrier switching method and apparatus, a switching configuration method and apparatus, a terminal device, and a network device.

BACKGROUND

In operation of Carrier Aggregation (CA) for R18 in New Radio (NR), uplink carrier switching across up to 4 bands is supported. The switching carriers and associated antenna port configuration are configured by a scheduling signaling.

In antenna port quantity configuration (hereinafter abbreviated as "antenna port configuration") for 3 carriers or 4 carriers, some antenna port configurations may exist in multiple cases. When scheduling signaling indicates a terminal to switch to a case, the terminal may not know which specific target scenario is to be switched to, leading to ambiguity in switching cases (or non-uniqueness or ambiguity).

SUMMARY

Embodiments of the present disclosure provide a carrier switching method and apparatus, a switching configuration method and apparatus, a terminal device, and a network device, to resolve a problem that a terminal cannot achieve accurate carrier switching due to existence of a switching case ambiguity.

To resolve the foregoing technical problem, an embodiment of the present disclosure provides a carrier switching method, performed by a terminal device, where the method includes: when a quantity of switching bands is greater than 2 and an antenna port configuration of a first carrier that is to perform data transmission is a first antenna port configuration, determining a target switching case for the first antenna port configuration of the first carrier based on first information, wherein the first antenna port configuration is one port; performing carrier switching according to the target switching case; wherein the first information includes: a relationship set of a first carrier and antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration includes an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier.

Optionally, the method further includes: receiving the relationship set of the first carrier and the antenna port configuration configured by a network device, when the first information includes the relationship set of the first carrier and the antenna port configuration; wherein the relationship set of the first carrier and the antenna port configuration is a subset of a full relationship set of carriers and antenna port configurations.

Optionally, the first information further includes second switching indication information, the second switching indication information is used to indicate oneT or twoT; the twoT represents data transmission using two ports, and the oneT represents data transmission using one port.

Optionally, determining the target switching case supporting the first antenna port configuration of the first carrier based on the first information includes: when the first information includes the relationship set of the first carrier and the antenna port configuration, and when determining that the relationship set of the first carrier and the antenna port configuration has only one carrier set based on a carrier set indicated by the network device, ignoring the second switching indication information and determining the carrier set indicated by the network device as a target switching case supporting the first antenna port configuration of the first carrier.

Optionally, determining the target switching case supporting the first antenna port configuration of the first carrier based on the first information includes: when the first information includes the first switching indication information, if the second switching indication information indicates the oneT, then determining the target switching case which supports the first antenna port configuration of the first carrier based on the first switching indication information; or when the first information includes the first switching indication information, if the second switching indication information indicates the twoT, then ignoring the first switching indication information and determining the target switching case which supports the first antenna port configuration of the first carrier based on the second switching indication information.

Optionally, the first switching indication information includes one of following: a carrier index of the second carrier; an absolute value of a difference between carrier indexes of the second carrier and the first carrier.

Optionally, the full relationship set of the carriers and the antenna port configurations includes: configured carrier sets corresponding to antenna port configurations in all switching cases under a quantity of bands used for switching; and/or a full relationship set, configured by the network device or predefined by a protocol, of carriers and antenna port configurations.

A carrier switching configuration method performed by a network device is further provided. The method includes: sending first information to a terminal device, wherein the first information is used to when a quantity of switching bands is greater than 2 and an antenna port configuration of a first carrier that is to perform data transmission is a first antenna port configuration, determine a target switching case for the first antenna port configuration of the first carrier based on first information, wherein the first antenna port configuration is one port; wherein the first information includes: a relationship set of a first carrier and antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration includes an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier.

Optionally, the relationship set of the first carrier and the antenna port configuration is a subset of a full relationship set of carriers and antenna port configurations.

Optionally, the first information further includes second switching indication information, the second switching indication information is used to indicate oneT or twoT; the twoT represents data transmission using two ports, and the oneT represents data transmission using one port.

Optionally, the first switching indication information includes one of following: a carrier index of the second carrier; an absolute value of a difference between carrier indexes of the second carrier and the first carrier.

Optionally, the full relationship set of the carriers and antenna port configurations includes: configured carrier sets corresponding to antenna port configurations in all switching cases under a quantity of bands used for switching.

A terminal device is further provided. The terminal device includes: a memory, a transceiver, and a processor, wherein, the memory stores a computer program; the transceiver is configured to send and receive data under control of the processor; and the processor is configured to execute the computer program to perform following operations: when a quantity of switching bands is greater than 2 and an antenna port configuration of a first carrier that is to perform data transmission is a first antenna port configuration, determining a target switching case for the first antenna port configuration of the first carrier based on first information, wherein the first antenna port configuration is one port; performing carrier switching according to the target switching case; wherein the first information includes: a relationship set of a first carrier and antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration includes an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier.

Optionally, the processor is further configured to read the computer program in the memory and perform following operations: receiving the relationship set, configured by a network device, of the first carrier and the antenna port configuration through the transceiver, when the first information includes the relationship set of the first carrier and the antenna port configuration; wherein the relationship set of the first carrier and the antenna port configuration is a subset of a full relationship set of carriers and antenna port configurations.

Optionally, the first information further includes second switching indication information, the second switching indication information is used to indicate oneT or twoT; the twoT represents data transmission using two ports, and the oneT represents data transmission using one port.

Optionally, the processor is further configured to read the computer program in the memory and perform following operations: when the first information includes the relationship set of the first carrier and the antenna port configuration, and when determining that the relationship set of the first carrier and the antenna port configuration has only one carrier set based on a carrier set indicated by the network device, ignoring the second switching indication information and determining a switching case corresponding to the carrier set indicated by the network device as a target switching case supporting the first antenna port configuration of the first carrier.

Optionally, the processor is further configured to read the computer program in the memory and perform following operations: when the first information includes the first switching indication information, if the second switching indication information indicates the oneT, then determining the target switching case that supports the first antenna port configuration of the first carrier based on the first switching indication information; or when the first information includes the first switching indication information, if the second switching indication information indicates the twoT, then ignoring the first switching indication information and determining the target switching case that supports the first antenna port configuration of the first carrier based on the second switching indication information.

Optionally, the first switching indication information includes one of following: a carrier index of the second carrier; an absolute value of a difference between carrier indexes of the second carrier and the first carrier.

A network device is further provided. The network device includes: a memory, a transceiver, and a processor, wherein, the memory stores a computer program; the transceiver is configured to send and receive data under control of the processor; and the processor is configured to execute the computer program to perform following operations: sending first information to a terminal device through the transceiver, wherein the first information is used to when a quantity of switching bands is greater than 2 and an antenna port configuration of a first carrier that is to perform data transmission is a first antenna port configuration, determine a target switching case for the first antenna port configuration of the first carrier based on first information, wherein the first antenna port configuration is one port; wherein the first information includes: a relationship set of a first carrier and antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration includes an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier.

A carrier switching apparatus applied to a terminal device is further provided. The apparatus includes: a determining unit configured to when a quantity of switching bands is greater than 2 and an antenna port configuration of a first carrier that is to perform data transmission is a first antenna port configuration, determine a target switching case for the first antenna port configuration of the first carrier based on first information, wherein the first antenna port configuration is one port; and a performing unit configured to perform carrier switching according to the target switching case; wherein the first information includes: a relationship set of a first carrier and antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration includes an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier.

A carrier switching configuration apparatus applied to a network device is provided. The apparatus includes: a sending unit configured to send first information to a terminal device, wherein the first information is used to when a quantity of switching bands is greater than 2 and an antenna port configuration of a first carrier that is to perform data transmission is a first antenna port configuration, determine a target switching case for the first antenna port configuration of the first carrier based on first information, wherein the first antenna port configuration is one port; wherein the first information includes: a relationship set of a first carrier and antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration includes an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier.

A processor-readable storage medium storing a computer program is further provided, wherein the computer program is configured to cause a processor to execute the method described above.

The beneficial effects of the present disclosure are as follow. According to the foregoing solution, in a case that the quantity of switching bands is greater than 2 and the antenna port configuration of the first carrier that is to perform data transmission is the first antenna port configuration, the target switching case of the first antenna port configuration of the first carrier is determined based on the relationship set of the first carrier and the antenna port configuration or the first switching indication information, and carrier switching is performed according to the target switching case, so that the carrier switching accuracy is ensured, and the reliability of network communication is ensured.

DETAILED DESCRIPTION

The technical solutions in the embodiments of the present disclosure will be clearly and completely described below with reference to the accompanying drawings in the embodiments of the present disclosure. All other embodiments obtained by a person of ordinary skill in the art based on the embodiments of the present disclosure without creative efforts shall fall within the protection scope of the present disclosure.

In the specification and claims of the present disclosure, the terms "first", "second", and the like are intended to distinguish between similar objects, and are not necessarily used to describe a specific order or sequence. It should be understood that the data used in this way can be interchanged under appropriate circumstances, so that the embodiments of the present disclosure described herein, for example, are implemented in an order other than those illustrated or described herein. In addition, the terms "include" and "have" and any deformation thereof are intended to cover a non-exclusive inclusion, for example, a process, method, system, product, or device that includes a series of steps or units is not necessarily limited to those steps or units listed clearly, but may include other steps or units that are not clearly listed or inherent to these processes, methods, products, or devices.

In the embodiments of the present disclosure, the term "and/or" describes an association relationship between associated objects, indicating that there may be three relationships, for example, A and/or B may indicate that A exists alone, A and B exist at the same time, and B exists alone. The character "/" generally indicates an "or" relationship between the associated objects. In the embodiments of the present disclosure, the term "a plurality of" means two or more, and other quantifiers are similar.

In the embodiments of the present disclosure, words such as "exemplary" or "for example" are used to represent examples, illustrations, or descriptions. Any embodiment or design scheme described as "example" or "for example" in the embodiments of the present disclosure should not be explained as being more preferred or having more advantages than another embodiment or design scheme. Exactly, words such as "exemplary" or "for example" are used to present related concepts in a specific manner.

The embodiments of the present disclosure are described below with reference to the accompanying drawings. The carrier switching method and apparatus, and the terminal device provided in the embodiments of the present disclosure may be applied to a wireless communication system. The wireless communication system may be a system using a fifth generation (5G) mobile communication technology (hereinafter referred to as a 5G system for short), and a person skilled in the art may understand that the 5G NR system is merely an example and is not limited.

Figure 1:
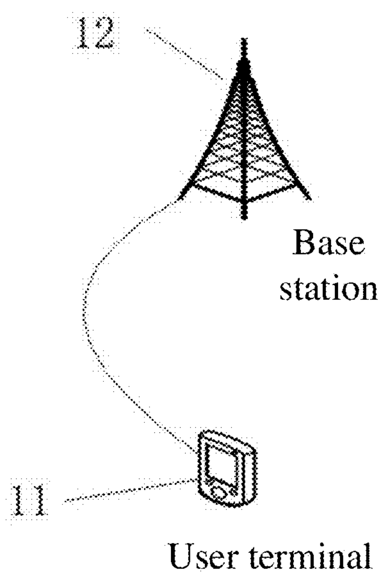
FIG. 1 shows a structural diagram of a network system applicable to an embodiment of the present disclosure.

Referring to FIG. 1, FIG. 1 is a structural diagram of a network system to which an embodiment of the present disclosure may be applied, as shown in FIG. 1, including a user terminal 11 and a base station 12, where the user terminal 11 may be user equipment (UE), for example, The terminal-side device such as a mobile phone, a tablet personal computer, a laptop computer, a personal digital assistant (PDA), a mobile Internet device (MID), or a wearable device. It should be noted that the specific type of the user terminal 11 is not limited in the embodiments of the present disclosure. The base station 12 may be a base station in a 5G and a later version (for example, a gNB, a 5G NR NB), or a base station in another communication system, or referred to as a node B. It should be noted that, in the embodiments of the present disclosure, only a 5G base station is used as an example, but a specific type of the base station 12 is not limited.

First, based on the technical solutions provided in the present disclosure, some technical terms that may be involved are introduced.

1.1 Support a Selective Transmission/Concurrent Process of a Carrier on a Multi-Band (Different Bands), Wherein the Main Purpose is to Enhance the Radio Coverage Capability of a Cell.

For example, when the terminal is in the center of a cell, the terminal is closer to the base station, and the terminal communicates using a carrier of a band with a relatively high frequency (for example, carrier-1 of 3.5 GHz 2-transmission (2-transport, 2-TX) MIMO, and a bandwidth 100 MHz), so that a higher data transmission rate can be obtained. When the terminal is at the edge of the cell, the terminal is far away from the base station, and the terminal performs communication (for example, carrier-1 of 2.1 GHZ and a bandwidth 20 MHz) by using a carrier with a band of a relatively low frequency, so that a certain performance coverage quality can be obtained. When the terminal is in the middle of the cell, the terminal is not too far away from the base station, and the terminal can simultaneously use carriers of two frequency bands (for example, carrier-1 of 2.1 GHZ and carrier-2 of 3.5 GHz) for communication, so that spectrum resources can be fully utilized, user experience is improved, and it is considered that the terminal is in a concurrent uplink mode.

1.2 Switching Process Between Transmission Carriers

Considering the cost problem of the terminal, some devices are shared among different carriers, so that the manufacturing cost can be reduced, but the switching time and the switching position need to be considered. At present, uplink switching between carriers on two different bands is supported, and a simple terminal structure model and switching process are shown in FIG. 2.

Figure 2:
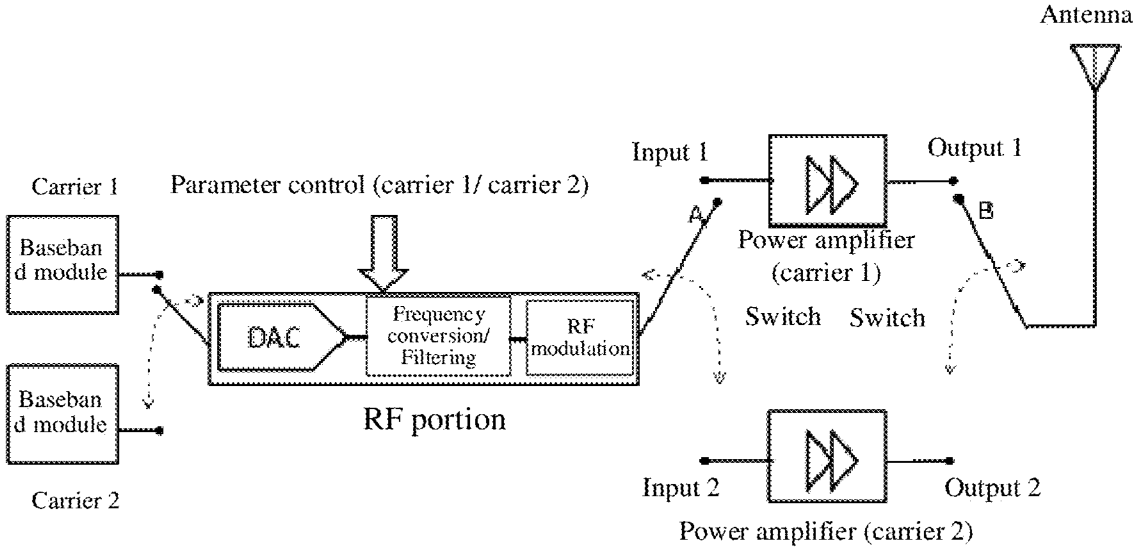
FIG. 2 is a schematic diagram of switching between two carriers in a channel 1.

As shown in FIG. 2, in terminal uplink communication, inter-carrier switching may occur, specifically, When a signal or a channel is sent on carrier-1, the control parameter of the radio frequency (RF) part adopts a value related to carrier-1, the output point A of the RF part is switched to the power amplifier input point 1 of carrier-1, and the power amplifier output 1 is switched to the antenna B at the same time;

when a signal or a channel is sent on carrier-2, the control parameter of the RF part adopts the value related to a carrier-2, the output point A of the RF part is switched to the power amplifier input point 2 of carrier-2, and the power amplifier output 2 is switched to the antenna B at the same time.

1.3 Support Switching Among 3 Carriers or 4 Carriers

In the technical discussion of NR R18, uplink switching of up to 3 carriers or 4 carriers needs to be supported, and the switching case (i.e. the attribute of the case 1 in Table 1 and Table 2, used to distinguish between different carrier configuration combinations) and the number configuration of antenna ports also includes multiple configurations. The switching cases of the 3 bands and 4 bands are described below.

For inter-carrier uplink switching of the 3 bands, the switching case combination is shown in Table 1,

TABLE 1

Three-Band Uplink Switching Scenario

| case | Number (c1 + c2 + c3) of Tx channels | Number (c1 + c2 + c3) of antenna ports |
|---|---|---|
| Case 1 | 0T + 1T + 1T | A1 = {0P + 0P + 1P}, A2 = {0P + 1P + 0P}, A3 = {0P + 1P + 1P} |
| Case 2 | 1T + 0T + 1T | A1 = {0P + 0P + 1P}, A4 = {1P + 0P + 0P}, A5 = {1P + 0P + 1P} |
| Case 3 | 1T + 1T + 0T | A2 = {0P + 1P + 0P}, A4 = {1P + 0P + 0P}, A6 = {1P + 1P + 0P} |
| Case 4 | 0T + 0T + 2T | B1 = {0P + 0P + 2P}, A1 = {0P + 0P + 1P} |
| Case 5 | 0T + 2T + 0T | B2 = {0P + 2P + 0P}, A2 = {0P + 1P + 0P} |
| Case 6 | 2T + 0T + 0T | B4 = {2P + 0P + 0P}, A4 = {1P + 0P + 0P} |

For inter-carrier uplink switching of the 4 bands, the switching case combination is shown in Table 2,

TABLE 2

Four-Band Uplink Switching Scenario

| case | Number (c1 + c2 + c3 + c4) of Tx channels | Number (c1 + c2 + c3 + c4) of antenna ports |
|---|---|---|
| Case 1 | 0T + 0T + 1T + 1T | A1 = {0P + 0P + 0P + 1P}, A2 = {0P + 0P + 1P + 0P}, A3 = {0P + 0P + 1P + 1P} |
| Case 2 | 0T + 1T + 0T + 1T | A1 = {0P + 0P + 0P + 1P}, A4 = {0P + 1P + 0P + 0P}, A5 = {0P + 1P + 0P + 1P} |
| Case 3 | 0T + 1T + 1T + 0T | A2 = {0P + 0P + 1P + 0P}, A4 = {0P + 1P + 0P + 0P}, A6 = {0P + 1P + 1P + 0P} |
| Case 4 | 1T + 1T + 0T + 0T | A4 = {0P + 1P + 0P + 0P}, A8 = {1P + 0P + 0P + 0P}, A12 = {1P + 1P + 0P + 0P} |
| Case 5 | 1T + 0T + 1T + 0T | A2 = {0P + 0P + 1P + 0P}, A8 = {1P + 0P + 0P + 0P}, A10 = {1P + 0P + 1P + 0P} |
| Case 6 | 1T + 0T + 0T + 1T | A1 = {0P + 0P + 0P + 1P}, A8 = {1P + 0P + 0P + 0P}, A9 = {1P + 0P + 0P + 1P} |
| Case 7 | 0T + 0T + 0T + 2T | B1 = {0P + 0P + 0P + 2P}, A1 = {0P + 0P + 0P + 1P} |
| Case 8 | 0T + 0T + 2T + 0T | B2 = {0P + 0P + 2P + 0P}, A2 = {0P + 0P + 1P + 0P} |
| Case 9 | 0T + 2T + 0T + 0T | B4 = {0P + 2P + 0P + 0P}, A4 = {0P + 1P + 0P + 0P} |
| Case 10 | 2T + 0T + 0T + 0T | B8 = {2P + 0P + 0P + 0P}, A8 = {1P + 0P + 0P + 0P} |

Note 1: in the table, C1 represents carrier-1 on band-1; C2 represents carrier-2 on band-2; and so on;

Note 2: OT indicates that 0 channel (uplink transmission unit) is occupied; 1T represents occupying one channel (uplink transmission unit), and so on;

Note 3: OP indicates that 0 antenna ports are occupied; 1P indicates that one antenna port is occupied, and so on; in Table 2, 4 carriers on 4 bands are defined, and C1/C2/C3/C4 are in one-to-one correspondence with parameters in various cases.

For example, A1={0 P+0P+0P+1P} in case-1 is taken as an example, and it should be noted that A1 may also be referred to as a carrier set, it represents that no TX channel (0T) is allocated on carrier-½, and no signal/data (0P) is transmitted;

it represents that one TX channel (1T) is allocated on carrier-3, but carrier-3 does not send any signal/data (0P);

it represents that one TX channel (IT) is allocated on carrier-4, carrier-4 uses one port to transmit signal/data (1P).

For example, B1={0 P+0P+0P+2P} in case-7 is taken as an example, it indicates that no TX channel (0T) is allocated on carrier-1/2/3, and no signal/data (0P) is sent;

2 TX channels (2T) are allocated on carrier-4, and carrier-4 uses 2 ports to transmit signals/data (2P).

It should be noted that there is no necessary relationship between the number of channels and the number of antenna ports involved in the present disclosure. For example, two TX channels (2T) are allocated on carrier-4, and carrier-4 also uses one port to send signals/data (1P).

In the uplink switching in R17, there is an uncertainty of case switching, as shown in Table 3,

TABLE 3

Two-band uplink switching scenarios

| case | Number (c1 + c2) of Tx channels | Number (c1 + c2) of antenna ports |
|---|---|---|
| Case 1 | 1T + 1T | A2 = {1P + 0P}, A3 = {1P + 1P}, A1 = {0P + 1P} |
| Case 2 | 0T + 2T | B1 = {0P + 2P}, A1 = {0P + 1P} |
| Case 3 | 2T + 0T | B2 = {2P + 0P, A2 = {1P + 0P} |

As shown in Table 3, A2 exists in two cases, in case 1 and case 3, respectively, and if the current case is B1 of case 2, the antenna port of the next switching is configured as A2, and the terminal does not know whether to switch to A2 of case-1 or A2 of case 3.

For the problem of ambiguity of the switching case appearing in R17, the solution is as follows:

- the higher-layer signaling configuration parameter uplinkTxSwitching-DualUL-TxCase may indicate "twoT" or "oneT";
- when "twoT" is indicated, the case that supports 2TX is switched (e.g. for A1, switching to A1 in case 2);
- when "oneT" is indicated, the case that supports 1TX+1TX is switched (e.g. for A1, switching to A1 in case 1).

In the related art, for the cases of two bands, there are at most two candidate scenarios, which are a 2TX scenario and a 1TX scenario.

However, for a 3-band or 4-band carrier switching, a related technical solution cannot be well used for indication. There are mainly the following two cases:

1. for the "oneT" inciated in the related art, there is a scenario in which there are a plurality of 1T transmissions in the 3-band/4-band, that is, if it is an "oneT" indication, ambiguity still exists; for example, for a 4-band carrier switching, the A1 antenna port is configured in 4 cases (respectively, case 1, case 2, case 6, case 7);
2. for the "twoT" indicated in the related art, it is possible to not support 2T transmission of all switching cases due to the UE capability, that is, only part of the switching cases is supported (for example, only 2T of carrier 4 is supported and 2T of carrier 3 is not supported), and when some carriers do not support "twoT", the indication is invalid.

Based on analysis, embodiments of the present disclosure provide a carrier switching method and apparatus, a switching configuration method and apparatus, a terminal device, and a network device, to resolve a problem that a terminal cannot achieve accurate carrier switching due to existence of a switching case ambiguity.

The method and the apparatus are based on the same application concept, and because the method and the apparatus solve a similar principle of a problem, the implementation of the apparatus and the method may refer to each other, and details are not described herein again.

Figure 3:
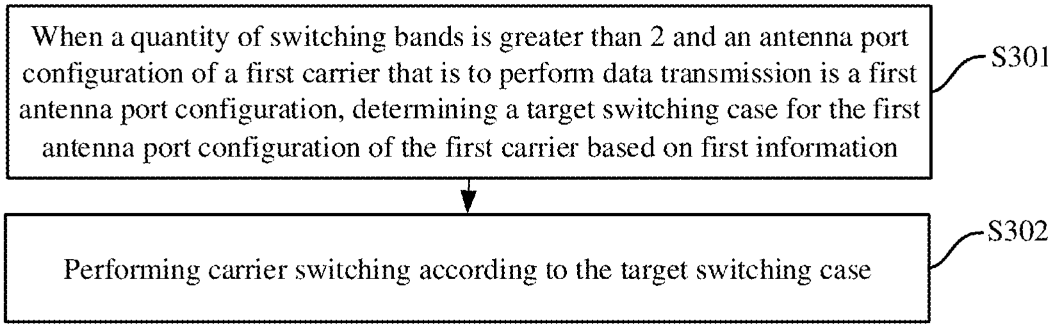
FIG. 3 is a schematic flowchart of a carrier switching method according to an embodiment of the present disclosure.

As shown in FIG. 3, an embodiment of the present disclosure provides a carrier switching method, performed by a terminal device. The method includes:

Step S301: in a case that a quantity of switching bands is greater than 2 and an antenna port configuration of a first carrier that is to perform data transmission is a first antenna port configuration, determining a target switching case of the first antenna port configuration of the first carrier based on first information, where the first antenna port configuration is 1 port;

Step S302: performing carrier switching according to the target switching case.

The first information includes one of the following:

- A11: a relationship set of a first carrier and an antenna port configuration;
- wherein, in a switching case of a first antenna port configuration of the first carrier in the relationship set of the first carrier and the antenna port configurations, only one target carrier and the first carrier form a carrier switching association relationship of a second antenna port configuration, the second antenna port configuration includes an antenna port configuration of the target carrier and the first antenna port configuration, and the antenna port configuration of the target carrier is 1 port;
- A12: first switching indication information;
- the first switching indication information is used to indicate a second carrier that constitutes a carrier switching association relationship with the first carrier.

The first carrier and the second carrier belong to carriers on different wavebands.

Optionally, the first carrier and the second carrier perform signal transmission or data transmission by using one port.

It should be noted that the embodiments of the present disclosure are applicable to a scenario in which the number of bands of any switching is greater than 2; optionally, the embodiments of the present disclosure are applicable to a scenario in which the quantity of switching bands is 3 or 4; and the data transmission in the embodiments of the present disclosure may refer to uplink transmission, or downlink transmission. Optionally, the embodiments of the present disclosure are applicable to the case of uplink carrier switching, that is, the data transmission refers to uplink transmission.

Optionally, the first carrier that is to perform data transmission refers to the target carrier to which the terminal is to switch the carrier, for example, the terminal performs data transmission on carrier-1 at the current time instant T1, the terminal needs to perform carrier switching at the time instant T2, and data transmission is performed on carrier-2 after the time instant T2, and the carrier-2 is the first carrier.

The present disclosure provides two implementations capable of solving the technical problem, which are described in detail below.

Implementation 1: the first information includes A11.

It should be noted that, in this case, the relationship between the carrier and the antenna port configuration, that is, the relationship set between of the first carrier and the antenna port configuration is reconfigured based on the full relationship set of carriers and antenna port configurations; it may be understood that the relationship set of the first carrier and antenna port configuration is a subset of the full relationship set of carriers and antenna port configurations.

Optionally, the full relationship set of carriers and the antenna port configurations is configured by a network device or agreed in a protocol; the full relationship set of carrier and antenna port configuration relationships includes: configured carrier sets corresponding to antenna port configurations in all switching cases under the number of bands used for switching; for example, a scenario in which the number of configured bands for switching is 3, the full relationship set of carriers and the antenna port configurations includes the foregoing content in Table 1; for example, for a scenario in which the number of configured bands for switching is 4, the full relationship set of the carriers and the antenna port configurations includes the foregoing content in Table 2.

Optionally, the relationship set of the first carrier and the antenna port configuration is usually configured by a network device, that is, before the terminal device determines, based on the first information, a target switching case in which the first antenna port configuration supporting the first carrier, the terminal device should further receive the relationship set of the first carrier and the antenna port configuration configured by the network device.

For example, when the number of configured bands for switching is 3 (that is, carrier switching is among 3 carriers), as shown in Table 1, if case 1 is supported (that is, when configuring carrier-3 and carrier-2 to form a switching association relationship, supporting carrier-2 and carrier-3 to be sent at the same time), the following conditions need to be met in the newly configured relationship set of the first carrier and the antenna port configuration:

case 2 cannot be supported again;

case 3 cannot be supported again.

The corresponding relationship set of the first carrier and the antenna port configuration is shown in Table 4.

TABLE 4

Configuration of the relationship set of the first carrier and the antenna port configuration in the three-band uplink switching scenario

| case | Number (c1 + c2 + c3) of Tx channels | Number (c1 + c2 + c3) of antenna ports |
|---|---|---|
| Case 1 | 0T + 1T + 1T | A1 = {0P + 0P + 1P}, A2 = {0P + 1P + 0P}, A3 = {0P + 1P + 1P} |
| Case 4 | 0T + 0T + 2T | B1 = {0P + 0P + 2P}, A1 = {0P + 0P + 1P} |
| Case 5 | 0T + 2T + 0T | B2 = {0P + 2P + 0P}, A2 = {0P + 1P + 0P} |
| Case 6 | 2T + 0T + 0T | B4 = {2P + 0P + 0P}, A4 = {1P + 0P + 0P} |

It can be learned from the foregoing description of the configurable switching case limit that, for a switching operation of three carriers, at most one of case 1, case 2, and case 3 in Table 1 is configured.

For example, when the number of configured bands for switching is 4 (that is, carrier switching is among 4 carriers), if case 1 is supported (that is, configuring carrier-3 and carrier-4 to form a switching association relationship, supporting carrier-4 and carrier-3 to be sent at the same time), the following conditions need to be met in the newly configured relationship set of the first carrier and the antenna port configuration:

case 2 cannot be supported again;

case 3 cannot be supported again;

case 5 cannot be supported again;

case 6 cannot be supported again.

The corresponding relationship set of the first carrier and the antenna port configuration is shown in Table 5.

TABLE 5

Configuration of the relationship set of the first carrier and the antenna port configuration in the four-band uplink switching scenario

| case | Number (c1 + c2 + c3 + c4) of Tx channels | Number (c1 + c2 + c3 + c4) of antenna ports |
|---|---|---|
| Case 1 | 0T + 0T + 1T + 1T | A1 = {0P + 0P + 0P + 1P}, A2 = {0P + 0P + 1P + 0P}, A3 = {0P + 0P + 1P + 1P} |
| Case 4 | 1T + 1T + 0T + 0T | A4 = {0P + 1P + 0P + 0P}, A8 = {1P + 0P + 0P + 0P}, A12 = {1P + 1P + 0P + 0P} |
| Case 7 | 0T + 0T + 0T + 2T | B1 = {0P + 0P + 0P + 2P}, A1 = {0P + 0P + 0P + 1P} |
| Case 8 | 0T + 0T + 2T + 0T | B2 = {0P + 0P + 2P + 0P}, A2 = {0P + 0P + 1P + 0P} |
| Case 9 | 0T + 2T + 0T + 0T | B4 = {0P + 2P + 0P + 0P}, A4 = {0P + 1P + 0P + 0P} |
| Case 10 | 2T + 0T + 0T + 0T | B8 = {2P + 0P + 0P + 0P}, A8 = {1P + 0P + 0P + 0P} |

From the configurable switching case limit described above, it will be appreciated that for a switching operation of 4 carriers, 1. when the base station configures only one 1P+1P antenna port configuration (i.e., configuring the antenna port configuration of each of the two carriers to be one port), the configurable case is one of the following 6 cases, case 1, case 2, case 3, case 4, case 5, case 6;
2. when the base station configures only two 1P+1P antenna port configurations, the configurable case is one of the following three case combinations, case 1 and case 4;

case 2 and case 5;

case 3 and case 6.

Optionally, under this circumstance, the first information further includes second switching indication information; and the second switching indication information is used to indicate oneT or twoT; and the twoT represents data transmission using two ports, and the oneT represents data transmission using one port.

Optionally, under this circumstance, the first information further includes second switching indication information; and the second switching indication information is used to indicate a channel type corresponding to the carrier set; and the channel type includes: performing data transmission by using one channel or performing data transmission by using two channels.

Based on the foregoing configuration, there may also be a problem of ambiguous switching for a certain carrier, and under this circumstance, it is necessary to explicitly define the carrier set corresponding to the switching of the terminal by using the second switching indication information.

The second switching indication information may be a high-layer signaling configuration parameter uplinkTx-Switching-DualUL-TxCase sent by the base station, where the parameter indicates "twoT" or "oneT", and is used to assist the terminal device in determining the target switching case; specifically, the port type corresponding to the twoT is data transmission using two ports, and the port type corresponding to the oneT is data transmission using one port.

For example, as shown in Table 4 (case 1 of a carrier association relationship), the base station only configures c2 and c3 to support simultaneous transmission of two carriers, that is, a "1P+1P" antenna port configuration (A3 in the case 1 in the above table) is supported. It should be noted that, the base station configures only c2 and c3 to support simultaneous transmission of two carriers, and at the same time, since the case 2 includes one antenna port transmission of c3, and case 3 includes one antenna port transmission of c2, and thus under this circumstance, case 2 and case 3 in Table 1 is not supported.

It should be noted that in this configuration, the quantities of antenna ports of only A1 and A2 have a plurality of cases, that is, there is a ambiguity problem, but the sending of the antenna port configuration of each 1 port is at most present in two cases, so that the switching case may be determined by using the second switching indication information.

Taking A1/A2 as an example, in the above configuration, the terminal determines the target switching case according to the parameter uplinkTxSwitching-DualUL-TxCase of the base station,

- when the second switching indication information indicats oneT, when the base station schedules to switch to the switching antenna port configuration of A1 or A2, the terminal switches to case 1;
- when the second switching indication information indicates twoT, when the base station schedules to switch to the switching antenna port configuration of A1, the base station switches to case 4, and when the base station schedules to switch to the switching antenna port configuration of A2, the base station switches to the case 5.

Further, in another embodiment of the present disclosure, the determining, based on the first information, a target switching case supporting the first antenna port configuration of the first carrier includes:

- when it is determined according to the carrier set indicated by the network device that the relationship set of the first carrier and the antenna port configuration has only one carrier set, ignoring the second switching indication information, and determining the carrier set indicated by the network device as the target switching case supporting the first antenna port configuration of the first carrier.

It should be noted that the carrier set indicated by the network device may be understood as that the network device must notify the terminal device of the antenna port configuration corresponding to the carrier to which the terminal device is to be switched during carrier switching.

In other words, for the second switching indication information indicated by the network device, the second switching indication information is used only when an ambiguous antenna port configuration occurs, and when there is only one carrier set corresponding to the antenna port configuration to be switched to, the indication value of the second switching indication information may be ignored, for example, based on Table 4, when the base station schedules to switch to the switching antenna port configuration of A4, the terminal switches to case 6, but does not consider the configuration value of the uplinkTxSwitching-DualUL-Tx-Case.

It should be noted that this implementation may be further understood as that in a "IT+1T" (1 TX transmission), carriers capable of being allocated to IT among different cases cannot overlap (intersect).

For example, for 4 carriers, a 1T+IT intersection of case 1 and case 2 is C4 (supporting transmission of 1 antenna port), and an intersection of 1T+1T of case 1 and case 3 is C3 (supporting transmission of 1 antenna port), an intersection of 1T+1T of case 1 and case 5 is C3 (supporting transmissio of 1 antenna port), an intersection of 1T+1T of case 1 and case 6 is C4 (supporting transmission of 1 antenna port), and if case 1 is configured, case 2, case 3, case 5 and case 6 cannot be configured.

It should be noted that, when carrier switching is performed, the network device indicates the target carrier to which the terminal is switched and the carrier set (and port configuration information) corresponding to the carrier for the terminal, and when the carrier set have the plurality of switching cases, the terminal does not know which port configuration information of the plurality of switching cases is to be used. In this implementation, in the 3-carrier or 4-carrier switching, the base station only configures some of all carrier configuration cases, and in a configurable scenario, the second switching indication information is used for further judgment in respect of the ambiguity, so as to ensure the accuracy of switching.

Implementation 2: The First Information Includes A12

It should be noted that this case additionally increases the configuration of the first switching indication information, and optionally, the first switching indication information includes one of the following:

- B11: a carrier index of the second carrier;
- B12: an absolute value of a difference between a carrier index of the second carrier relative to that of the first carrier.

For example, an optional configuration manner is as follows:

It is assumed that the following parameters are configured for a serving cell with

```
"cell ID = 1";
Uplink transmit switching configuration (UplinkTxSwitching) {
{ a carrier to which a configuration cell belongs
(uplinkTxSwitchingCarrier-r16) ENUMERATED {carrier1, carrier2,
carrier3, carrier4}
a "1P + 1P" switching target case corresponding to a
configuration cell (uplinkTxSwitching1P-pair) ENUMERATED {carrier1,
carrier2, carrier3, carrier4} }
```

In the above, the carrier to which a cell belongs (uplinkTxSwitchingCarrier-r16) is configured as an enumerated typ (ENUMERATED), a carrier index of the cell is defined and used, for example, when carrier-1 is selected, it indicates that the serving cell of "cell ID=1" is carrier-1 when the uplink carrier is switched; a "1P+1P" switching target case corresponding to the cell is configured as an enumerated type (ENUMERATED), an "1P+1P" antenna port configuration of cell is defined and used, and when ambiguity occurs, if the base station indicates to switch to oneT, a case corresponding to the "1P+1P" antenna port configuration is switched to.

For example, for the full relationship set of the carriers and antenna port configurations of Table 2, it is assumed that the serving cell of "cell ID=4" needs to be configured as carrier-4 (C4), and when the transmission of carrier-4 is indicated as the antenna port configuration of A1 (the uplink transmission is only the carrier-4 for which the antenna port configuration is 1 port), the terminal can only switch to A1 of case 1; the parameters configured by the base station are as follows:

```
Uplink transmit switching configuration (UplinkTxSwitching) {
a carrier to which a configuration cell belongs
(uplinkTxSwitchingCarrier-r16) ENUMERATED {carrier 4}
a "1P+1P" switching target case corresponding to a configuration
cell (uplinkTxSwitching1P-association relationship) ENUMERATED
{carrier3} }
```

The above configuration shows that when a transmission case that the terminal uses does not support A1 (in any one of case 3, case 4, case 5, case 8, case 9, and case 10), if the scheduling of the base station indicates to switch to the A1 antenna port configuration, the terminal switches to a case supporting C3 (1P)+C4 (1P), that is, switches to A1 in case 1.

Optionally, in another embodiment of the present disclosure, the first information further includes second switching indication information, and the second switching indication information is used to indicate oneT or twoT; the twoT represents data transmission using two ports, and the oneT represents data transmission using one port.

Further, the determining, based on the first information, a target switching case supporting the first antenna port configuration of the first carrier includes one of the following:

B21: if the second switching indication information indicates the oneT, determining a target switching case supporting a first antenna port configuration of the first carrier based on the first switching indication information;

it should be noted that, if the second switching indication information indicates the oneT, the terminal device needs to determine, based on the first switching indication information and the carrier set indicated by the network device, the switching case corresponding to the switching carrier association relationship formed by the switched-from carrier and the switched-to target carrier;

B23: if the second switching indication information indicates the twoT, ignoring the first switching indication information, and determining, based on the second switching indication information, a target switching case supporting a first antenna port configuration of the first carrier; and it should be noted that, in this case, the second switching indication information is determined to have the highest priority to determine the target switching carrier, that is, as long as the second switching indication information indicates the twoT, even if the first switching indication information is received, the terminal ignores the first switching indicaiton information and directly determines the target switching case according to the second switching indication information and the carrier set indicated by the network device.

It should also be noted that, if the carrier index corresponding to the switching target case of the "1P+1 P" corresponding to the configuration cell is the same as the index of the configuration cell, it may also be considered as the case of switching to the 2TX (twoT), and under this circumstance, it may be considered that the first switching indication information is used to indicate to use two ports to perform data transmission, and, if the network device configures the second switching indication information, the terminal also directly ignores the second switching indication information; or, in order to save signaling overhead, the network device may directly not configure the second switching indication information, and directly use the first switching indication information to determine the target switching case.

For example, if the serving cell of "cell ID=1" needs to be configured as carrier-4 (c1); when the transmission of carrier-1 is configured to A8 (uplink transmission is only 1P carrier-1), the terminal can only switch to case-10; then for the serving cell of "cell ID=1", the parameters that the base station can configure are as follow:

```
Uplink transmit switching configuration (UplinkTxSwitching) {
a carrier to which a configuration cell belongs
(uplinkTxSwitchingCarrier-r16) ENUMERATED {carrier1}
a wwitching target case of "1P +1 P" corresponding to a
configuration cell (uplinkTxSwitching 1P-association relationship)
ENUMERATED {carrier1} }
```

It should be noted that, in this implementation, for a carrier that may have a switching ambiguity, a second carrier is indicated, and the second carrier and a carrier to be switched to by the terminal constitute a switching case corresponding to a "1P+1P antenna port configuration", so that the terminal can accurately determine the target switching case used during switching.

In summary, the embodiments of the present disclosure solve the problem of ambiguity in carrier switching with the number of switching bands being greater than 2, that is, it is ensured that uplink transmission switching is effectively performed, and meanwhile, the present disclosure can further utilize the existing signaling indication to the maximum extent, thereby reducing signaling overhead.

The technical solutions provided in the embodiments of the present disclosure may be applicable to various systems, especially 5G systems. For example, the applicable system may be a Global System of Mobile Communication (GSM) system, a Code Division Multiple Access (CDMA) system, a Wideband Code Division Multiple Access (WCDMA) system, a Long Term Evolution (LTE) system, a Long Term Evolution Advanced (LTE-A) system, a Universal Mobile Telecommunication System (UMTS), a Worldwide Interoperability for Microwave Access (WiMAX) system, a 5G new radio (NR) system, and the like. The plurality of systems each includes a terminal device and a network device. The system may further include a core network part, for example, an Evolved Packet System (EPS), a 5G system (5 GS), and the like.

The terminal device in the embodiments of the present disclosure may be a device that provides voice and/or data connectivity to a user, a handheld device having a wireless connection function, or another processing device connected to a wireless modem. In different systems, the name of the terminal device may be different, for example, in a 5G system, the terminal device may be referred to as user equipment (UE). The wireless terminal device may communicate with one or more core networks (CN) via a radio access network (RAN), and the wireless terminal device may be a mobile terminal device, such as a mobile phone (or referred to as a "cellular" phone) and a computer having a mobile terminal device, for example, may be a portable, pocket-sized, handheld, computer-built-in or vehicle-mounted mobile device, which exchanges language and/or data with a radio access network. For example, devices such as a Personal Communication Service (PCS) phone, a cordless phone, a Session Initiated Protocol (SIP) phone, a Wireless Local Loop (WLL) station, and a personal digital assistant (PDA). The wireless terminal device may also be referred to as a system, a subscriber unit, a subscriber station, a mobile station, a mobile station, a remote station, an access point, a remote terminal, an access terminal, a user terminal, a user agent, and a user device, which are not limited in the embodiments of the present disclosure.

The network device in this embodiment of the present disclosure may be a base station, and the base station may include a plurality of cells that provide a service for the terminal. Depending on the specific application scenario, the base station may also be referred to as an access point, or may be a device in the access network that communicates with the wireless terminal device through one or more sectors on the air interface, or another name. The network device may be configured to replace the received over-the-air frame with an Internet Protocol (IP) packet as a router between the wireless terminal device and the rest of the access network, where the rest of the access network may include an Internet Protocol (IP) communication network. The network device may also coordinate attribute management of the air interface. For example, the network device in the embodiments of the present disclosure may be a network device (a Base Transceiver Station, BTS) in a Global System for Mobile Communications (GSM) or a Code Division Multiple Access (CDMA), or may be a 5G base station in a Long Term Evolution (LTE) system, that is, a Next Generation Node B (a Next Generation Node B, a Relay Node), a home base station (Femto), a pico base station (Pico), or the like. In some network structures, the network device may include a centralized unit (CU) node and a distributed unit (DU) node, and the centralized unit and the distribution unit may also be geographically separated.

The network device and the terminal device may each perform multi-input multi-output (MIMO) transmission by using one or more antennas, and the MIMO transmission may be single user MIMO (SU-MIMO) or multi-user MIMO (MU-MIMO). The MIMO transmission may be two-dimensional MIMO (2D-MIMO), 3-dimensional MIMO (3D-MIMO), full dimension MIMO (FD-MIMO), or massive MIMO (Massive-MIMO), or diversity transmission or precoding transmission or beamforming transmission, according to the form and quantity of the root antenna combination.

Figure 4:
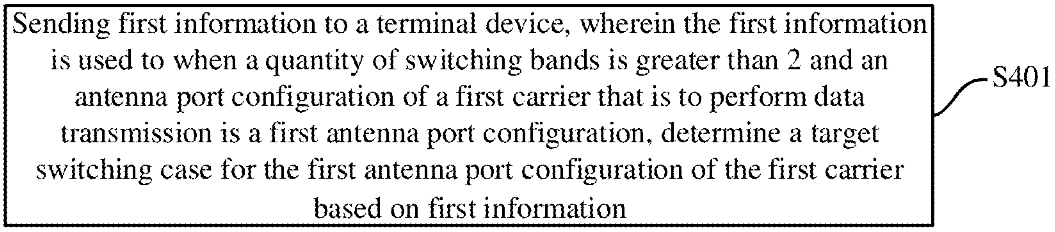
FIG. 4 is a schematic flowchart of a carrier switching configuration method according to an embodiment of the present disclosure.

Corresponding to an implementation of a terminal device, as shown in FIG. 4, an embodiment of the present disclosure provides a carrier switching configuration method, applied to a network device. The method includes:

Step S401: sending first information to a terminal device, where the first information is used to determine a target switching case for a first antenna port configuration of the first carrier based on the first information when a quantity of switching bands is greater than 2 and an antenna port configuration of a first carrier that is to perform data transmission is a first antenna port configuration, where the first antenna port is configured as a 1 port;

The first information includes:

a relationship set of a first carrier and an antenna port configuration; wherein, in a switching case of a first antenna port configuration of the first carrier in the relationship set of the first carrier and the antenna port configurations, only one target carrier and the first carrier form a carrier switching association relationship of a second antenna port configuration, the second antenna port configuration includes an antenna port configuration of the target carrier and the first antenna port configuration, and the antenna port configuration of the target carrier is 1 port; or first switching indication information; wherein the first switching indication information is used to indicate a second carrier that constitutes a carrier switching association relationship with the first carrier.

Optionally, the first carrier and the second carrier belong to carriers on different bands; and/or the first carrier and the second carrier perform signal transmission or data transmission by using one port.

Optionally, the relationship set of the first carrier and the antenna port configuration is a subset of a full relationship set of carriers and antenna port configurations.

Optionally, the first information further includes second switching indication information; and the second switching indication information is used to indicate an oneT or a twoT; and the twoT represents data transmission using two ports, and the oneT represents data transmission using one port.

Optionally, the first switching indication information includes one of the following: a carrier index of the second carrier;

an absolute value of a difference between a carrier index of the second carrier relative to that of the first carrier.

Optionally, the full relationship set of the carriers and the antenna port configuration includes: a configured carrier set corresponding to all switching cases under the number of bands for switching.

It should be noted that all descriptions about the network device in the foregoing embodiments are applicable to the embodiments of the power headroom reporting method, and can also achieve the same technical effect, and details are not described herein again.

Figure 5:
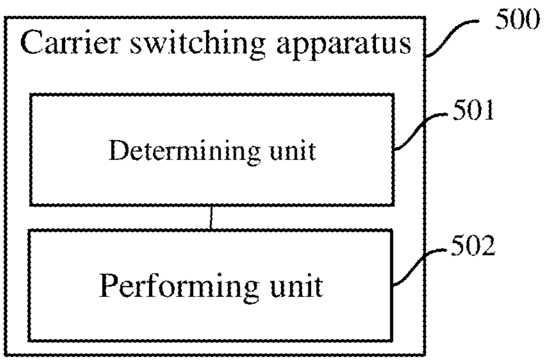
FIG. 5 is a schematic diagram of units of a carrier switching apparatus according to an embodiment of the present disclosure.

As shown in FIG. 5, an embodiment of the present disclosure provides a carrier switching apparatus 500 applied to a terminal device. The apparatus 500 includes:

a determining unit 501 configured to when a quantity of switching bands is greater than 2 and an antenna port configuration of a first carrier that is to perform data transmission is a first antenna port configuration, determine a target switching case for the first antenna port configuration of the first carrier based on first information, wherein the first antenna port configuration is one port; and a performing unit 502 configured to perform carrier switching according to the target switching case;

wherein the first information includes: a relationship set of a first carrier and an antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration includes an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier.

Optionally, the first carrier and the second carrier are carriers on different frequency bands; and/or the first carrier and the second carrier use one port for signal transmission or data transmission.

Optionally, the carrier switching apparatus 500 further includes:

a receiving unit configured to receive the relationship set, configured by a network device, of the first carrier and the antenna port configuration, when the first information includes the relationship set of the first carrier and the antenna port configuration; wherein the relationship set of the first carrier and the antenna port configuration is a subset of a full relationship set of carriers and antenna port configurations.

Optionally, the first information further includes second switching indication information, the second switching indication information is used to indicate oneT or twoT; the twoT represents data transmission using two ports, and the oneT represents data transmission using one port.

Further, the performing unit 502 is configured to, when the first information includes the relationship set of the first carrier and the antenna port configuration, and when determining that the relationship set of the first carrier and the antenna port configuration has only one carrier set based on a carrier set indicated by the network device, ignore the second switching indication information and determine the carrier set indicated by the network device as a target switching case supporting the first antenna port configuration of the first carrier.

Further, the performing unit 502 is configured to, when the first information includes the first switching indication information, if the second switching indication information indicates the oneT, then determine the target switching case of the first antenna port configuration of the first carrier based on the first switching indication information; or when the first information includes the first switching indication information, if the second switching indication information indicates the twoT, then ignore the first switching indication information and determine the target switching case of the first antenna port configuration of the first carrier based on the second switching indication information.

Optionally, the first switching indication information includes one of following: a carrier index of the second carrier; an absolute value of a difference between carrier indexes of the second carrier and the first carrier.

Optionally, the full relationship set of the carriers and antenna port configurations includes: configured carrier sets corresponding to antenna port configurations in all switching cases under a quantity of bands used for switching; and/or a full relationships set of carrier and antenna port configuration configured by the network device or predefined by a protocol.

It should be noted that the apparatus embodiment is an apparatus corresponding to the foregoing method embodiment 1, and all implementations in the foregoing method embodiments are applicable to the apparatus embodiment, and can also achieve the same technical effect.

It should be noted that the division of the units in the embodiments of the present disclosure is schematic, and is merely a logical function division, and there may be another division manner in actual implementation. In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a processor-readable storage medium. Based on such understanding, the technical solution of the present disclosure essentially or all or part of the technical solution that contributes to the prior art may be embodied in the form of a software product, and the computer software product is stored in a storage medium, and includes several instructions for causing a computer device (which may be a personal computer, a server, or a network device) or a processor to perform all or part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disk.

Figure 6:
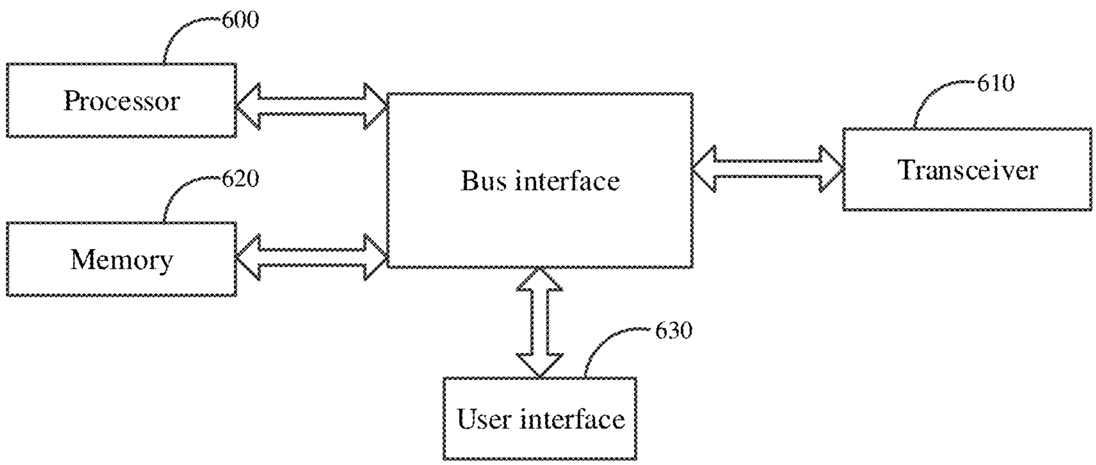
FIG. 6 is a structural diagram of a terminal device according to an embodiment of the present disclosure.

As shown in FIG. 6, an embodiment of the present disclosure further provides a terminal device, including a processor 600, a transceiver 610, a memory 620, and a program stored on the memory 620 and executable on the processor 600, where the transceiver 610 is connected to the processor 600 and the memory 620 through a bus interface, and the processor 600 is configured to read a program in the memory to perform the following processes:

when a quantity of switching bands is greater than 2 and an antenna port configuration of a first carrier that is to perform data transmission is a first antenna port configuration, determining a target switching case for the first antenna port configuration of the first carrier based on first information, wherein the first antenna port configuration is one port;

performing carrier switching according to the target switching case;

wherein the first information includes:

a relationship set of a first carrier and an antenna port, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration includes an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier.

The transceiver 610 is configured to receive and send data under the control of the processor 600.

In FIG. 6, the bus architecture may include any number of interconnected buses and bridges, and specifically, various circuits of one or more processors represented by the processor 600 and a memory represented by the memory 620 are linked together. The bus architecture may also link various other circuits, such as a peripheral device, a voltage regulator, and a power management circuit, which are well known in the art, and therefore are not further described herein. The bus interface provides an interface. The transceiver 610 may be a plurality of elements, including a transmitter and a receiver, and provides units for communicating with various other apparatuses on a transmission medium, where the transmission mediums include transmission media such as a wireless channel, a wired channel, and an optical cable. For different user equipment, the user interface 630 may also be an interface capable of being externally connected to a device needing to be internally connected, and the connected device includes but is not limited to a keypad, a display, a speaker, a microphone, a joystick, and the like.

The processor 600 is responsible for managing the bus architecture and general processing, and the memory 620 may store data used by the processor 600 when performing operations.

Optionally, the processor 600 may be a Central Processing Unit (CPU), an Application Specific Integrated Circuit (ASIC), a Field-Programmable Gate Array (FPGA), or a Complex Programmable Logic Device (CPLD), and the processor may also use a multi-core architecture.

The processor invokes the computer program stored in the memory, and is configured to perform any one of the methods provided in the embodiments of the present disclosure according to the obtained executable instruction. The processor and the memory may also be physically separated.

Optionally, the first carrier and the second carrier belong to carriers on different frequency bands; and/or the first carrier and the second carrier use one port for signal transmission or data transmission Optionally, the processor is configured to read a computer program in the memory and perform the following operations:

- receiving the relationship set, configured by a network device, of the first carrier and the antenna port configuration through the transceiver, when the first information includes the relationship set of the first carrier and the antenna port configuration; wherein the relationship set of the first carrier and the antenna port configuration is a subset of a full relationship set of carriers and antenna port configurations.

Optionally, the first information further includes second switching indication information, the second switching indication information is used to indicate oneT or twoT; the twoT represents data transmission using two ports, and the oneT represents data transmission using one port.

Optionally, the processor is configured to read a computer program in the memory and perform the following operations:

- when the first information includes the relationship set of the first carrier and the antenna port configuration, and when determining that the relationship set of the first carrier and the antenna port configuration has only one carrier set based on a carrier set indicated by the network device, ignoring the second switching indication information and determining the carrier set indicated by the network device as a target switching case supporting the first antenna port configuration of the first carrier.

Optionally, the processor is configured to read a computer program in the memory and perform the following operations:

- when the first information includes the first switching indication information, if the second switching indication information indicates the oneT, then determining the target switching case of the first antenna port configuration of the first carrier based on the first switching indication information; or
- when the first information includes the first switching indication information, if the second switching indication information indicates the twoT, then ignoring the first switching indication information and determining the target switching case of the first antenna port configuration of the first carrier based on the second switching indication information.

Optionally, the first switching indication information includes one of the following:

- a carrier index of the second carrier;
- an absolute value of a difference between carrier indexes of the second carrier and the first carrier.

Optionally, the full relationship set of the carriers and the antenna port configuration includes: configured carrier sets corresponding to antenna port configurations in all switching cases under a quantity of bands used for switching; and/or a full relationship set of carriers and antenna port configurations configured by the network device or predefined by a protocol.

At least one embodiment of the present disclosure further provides a terminal device, comprising a memory, a processor, and a computer program stored in the memory and executable on the processor, wherein when the processor executes the program, each process applied to the carrier switching method embodiment of the terminal device is implemented, and the same technical effect can be achieved, which will not be repeated here in order to avoid repetition.

At least one embodiment of the present disclosure further provides a computer-readable storage medium, on which a computer program is stored, and when the program is executed by a processor, each process applied to the carrier switching method embodiment of the terminal device as described above is implemented, and the same technical effect can be achieved. The computer-readable storage medium is, for example, a read-only memory (Read-Only Memory, ROM), a Random Access Memory (RAM), a magnetic disk, or an optical disk.

Figure 7:
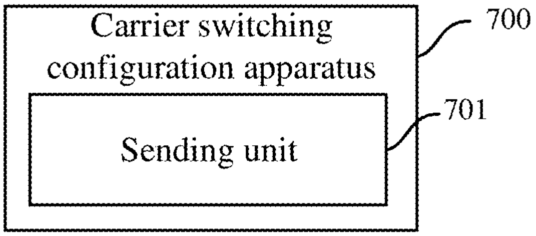
FIG. 7 is a schematic diagram of units of a carrier switching configuration apparatus according to an embodiment of the present disclosure.

As shown in FIG. 7, an embodiment of the present disclosure provides a carrier switching configuration apparatus 700 applied to a network device. The apparatus includes:

- a sending unit 701, configured to send first information to a terminal device, wherein the first information is used to when a quantity of switching bands is greater than 2 and an antenna port configuration of a first carrier that is to perform data transmission is a first antenna port configuration, determine a target switching case for the first antenna port configuration of the first carrier based on first information, wherein the first antenna port configuration is one port;
- wherein the first information includes:
- a relationship set of a first carrier and an antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration includes an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier.

Optionally, the first carrier and the second carrier belong to carriers on different frequency bands; and/or the first carrier and the second carrier use one port for signal transmission or data transmission.

Optionally, the relationship set of the first carrier and the antenna port configuration is a subset of a full relationship set of carriers and antenna port configurations.

Optionally, the first information further includes second switching indication information, the second switching indication information is used to indicate oneT or twoT; the twoT represents data transmission using two ports, and the oneT represents data transmission using one port.

Optionally, the first switching indication information includes one of following: a carrier index of the second carrier; an absolute value of a difference between carrier indexes of the second carrier and the first carrier.

Optionally, the full relationship set of the carriers and antenna port configurations includes: configured carrier sets corresponding to antenna port configurations in all switching cases under a quantity of bands used for switching.

It should be noted that the apparatus embodiment is an apparatus corresponding to the foregoing method embodiment 1, and all implementations in the foregoing method embodiments are applicable to the apparatus embodiment, and can also achieve the same technical effect.

It should be noted that the division of the units in the embodiments of the present disclosure is schematic, and is merely a logical function division, and there may be another division manner in actual implementation. In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a processor-readable storage medium. Based on such understanding, the technical solution of the present disclosure essentially or all or part of the technical solution that contributes to the prior art may be embodied in the form of a software product, and the computer software product is stored in a storage medium, and includes several instructions for causing a computer device (which may be a personal computer, a server, or a network device) or a processor to perform all or part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disk.

Figure 8:
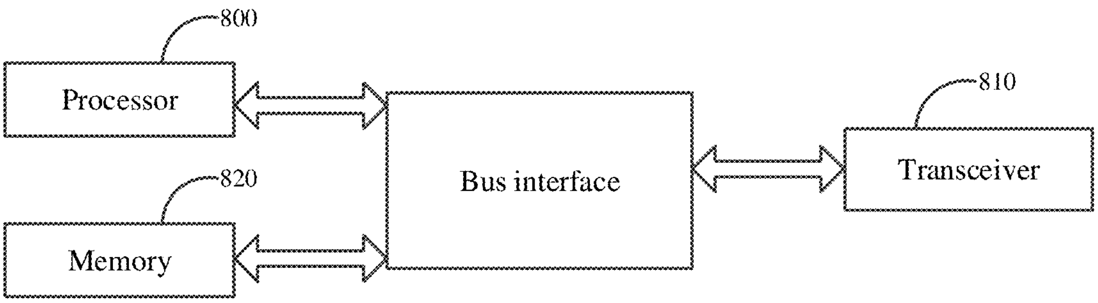
FIG. 8 is a structural diagram of a network device according to an embodiment of the present disclosure.

As shown in FIG. 8, an embodiment of the present disclosure further provides a network device, including a processor 800, a transceiver 810, a memory 820, and a program stored on the memory 820 and executable on the processor 800, where the transceiver 810 is connected to the processor 800 and the memory 820 through a bus interface, and the processor 800 is configured to read a program in the memory to perform the following processes:

sending first information to a terminal device through the transceiver 810, wherein the first information is used to when a quantity of switching bands is greater than 2 and an antenna port configuration of a first carrier that is to perform data transmission is a first antenna port configuration, determine a target switching case for the first antenna port configuration of the first carrier based on first information, wherein the first antenna port configuration is one port;

wherein the first information includes:

a relationship set of a first carrier and an antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration includes an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier.

The transceiver 810 is configured to receive and send data under the control of the processor 800.

In FIG. 8, the bus architecture may include any number of interconnected buses and bridges, and specifically, various circuits of one or more processors represented by the processor 800 and a memory represented by the memory 820 are linked together. The bus architecture may also link various other circuits, such as a peripheral device, a voltage regulator, and a power management circuit, which are well known in the art, and therefore are not further described herein. The bus interface provides an interface. The transceiver 810 may be a plurality of elements, that is, includes a transmitter and a receiver, and provides units for communicating with various other apparatuses on a transmission medium, where the transmission mediums include transmission media such as a wireless channel, a wired channel, and an optical cable.

The processor 800 is responsible for managing the bus architecture and general processing, and the memory 820 may store data used by the processor 800 when performing operations.

Optionally, the processor 800 may be a CPU, an ASIC, an FPGA, or a CPLD, and the processor may alternatively use a multi-core architecture.

The processor invokes the computer program stored in the memory, and is configured to perform any one of the methods provided in the embodiments of the present disclosure according to the obtained executable instruction. The processor and the memory may also be physically separated.

Optionally, the first carrier and the second carrier belong to carriers on different frequency bands; and/or the first carrier and the second carrier use one port for signal transmission or data transmission.

Optionally, the relationship set of the first carrier and the antenna port configuration is a subset of a full relationship set of carriers and antenna port configurations.

Optionally, the first information further includes second switching indication information, the second switching indication information is used to indicate oneT or twoT; the twoT represents data transmission using two ports, and the oneT represents data transmission using one port.

Optionally, the first switching indication information includes one of the following: a carrier index of the second carrier; an absolute value of a difference between carrier indexes of the second carrier and the first carrier.

Optionally, the full relationship set of the carriers and antenna port configurations includes: configured carrier sets corresponding to antenna port configurations in all switching cases under a quantity of bands used for switching.

It should be noted that the above-mentioned network device provided in the embodiments of the present disclosure can implement all method steps implemented in the foregoing method embodiments, and can achieve the same technical effect, and details of the same parts and beneficial effects as those in the method embodiments in this embodiment are not described herein again.

An embodiment of the present disclosure further provides a computer-readable storage medium, on which a computer program is stored, where the computer program, when executed by a processor, implements the steps of the carrier switching configuration method applied to the network device. The processor-readable storage medium may be any usable medium or data storage device accessible by a processor, including but not limited to a magnetic memory (for example, a floppy disk, a hard disk, a magnetic tape, a magneto-optical disk (DVD), a Blu-ray disk (BD), a high-definition versatile disk (EPROM), an electrically erasable programmable read-only memory (EEPROM), a non-volatile memory (NAND FLASH), a solid case hard disk (SSD)), and the like.

A person skilled in the art should understand that the embodiments of the present disclosure may be provided as a method, a system, or a computer program product. Therefore, the present disclosure may take the form of an entirely hardware embodiment, an entirely software embodiment, or an embodiment combining software and hardware aspects. Moreover, the present disclosure may use a form of a computer program product implemented on one or more computer-usable storage media (including but not limited to a disk memory, an optical memory, and the like) including computer-usable program codes.

The present disclosure is described with reference to the flowcharts and/or block diagrams of the method, the device (system), and the computer program product according to the embodiments of the present disclosure. It should be understood that each process and/or block in the flowcharts and/or block diagrams and a combination of processes and/or blocks in the flowcharts and/or block diagrams may be implemented by computer-executable instructions. These computer-executable instructions may be provided to a processor of a general-purpose computer, a special-purpose computer, an embedded processor, or other programmable data processing devices to generate a machine, so that the instructions executed by the processor of the computer or other programmable data processing devices generate means for implementing the functions specified in one or more flows of the flowcharts and/or one or more blocks in the block diagrams.

These processor-executable instructions may also be stored in a processor-readable memory that can direct a computer or other programmable data processing device to function in a particular manner, such that the instructions stored in the processor-readable memory produce an article of manufacture including an instruction device that implements the functions specified in one or more flows of the flowchart and/or one or more blocks of the block diagram.

These processor-executable instructions may also be loaded onto a computer or other programmable data processing device such that a series of operational steps are performed on the computer or other programmable device to produce a computer-implemented process, such that the instructions executed on the computer or other programmable device provide steps for implementing the functions specified in one or more flows of the flowchart and/or one or more blocks of the block diagram.

Evidently those skilled in the art can make various modifications and variations to the disclosure without departing from the spirit and scope of the disclosure. In this way, if these modifications and variations of the present disclosure fall within the scope of the claims of the present disclosure and their equivalent technologies, the present disclosure is also intended to include these modifications and variations.

What is claimed is:

1. A carrier switching method performed by a terminal device, the method comprising, when a quantity of switching bands is greater than 2 and an antenna port configuration of a first carrier that is to perform data transmission is a first antenna port configuration, determining a target switching case for the first antenna port configuration of the first carrier based on first information, wherein the first antenna port configuration is one port;

performing carrier switching according to the target switching case;

wherein the first information comprises:

a relationship set of a first carrier and antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration comprises an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier;

wherein the first information further comprises second switching indication information, the second switching indication information is used to indicate data transmission using two ports, or data transmission using one port;

wherein determining the target switching case for the first antenna port configuration of the first carrier based on the first information comprises:

when the first information comprises the relationship set of the first carrier and the antenna port configuration, and when determining that the relationship set of the first carrier and the antenna port configuration has only one carrier set based on a carrier set indicated by the network device, ignoring the second switching indication information and determining a switching case corresponding to the carrier set indicated by the network device as a target switching case supporting the first antenna port configuration of the first carrier; or when the first information comprises the first switching indication information, if the second switching indication information indicates oneT, then determining the target switching case of the first antenna port configuration of the first carrier based on the first switching indication information; or when the first information comprises the first switching indication information, if the second switching indication information indicates twoT, then ignoring the first switching indication information and determining the target switching case of the first antenna port configuration of the first carrier based on the second switching indication information.

2. The method according to claim 1, wherein, the first carrier and the second carrier belong to carriers on different frequency bands; and/or the first carrier and the second carrier use one port for signal transmission or data transmission.

3. The method according to claim 1, further comprising: receiving the relationship set of the first carrier and the antenna port configuration configured by a network device, when the first information comprises the relationship set of the first carrier and the antenna port configuration;

wherein the relationship set of the first carrier and the antenna port configuration is a subset of a full relationship set of carriers and antenna port configurations.

4. The method according to claim 3, wherein the full relationship set of the carriers and the antenna port configurations comprises:

configured carrier sets corresponding to antenna port configurations in all switching cases under a quantity of bands used for switching; and/or a full relationship set, configured by the network device or predefined by a protocol, of carriers and antenna port configurations.

5. The method according to claim 1, wherein the first switching indication information comprises one of following:

a carrier index of the second carrier;

an absolute value of a difference between carrier indexes of the second carrier and the first carrier.

6. A carrier switching configuration method performed by a network device, the method comprising:

sending first information to a terminal device, wherein the first information is used by the terminal device to, when a quantity of switching bands is greater than 2 and an antenna port configuration of a first carrier that is to perform data transmission is a first antenna port configuration, determine a target switching case for the first antenna port configuration of the first carrier based on first information, wherein the first antenna port configuration is one port;

wherein the first information comprises:

a relationship set of a first carrier and antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration comprises an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier;

wherein the first information further comprises second switching indication information, the second switching indication information is used to indicate data transmission using two ports, or data transmission using one port;

when the first information comprises the relationship set of the first carrier and the antenna port configuration, and when the terminal device determines that the relationship set of the first carrier and the antenna port configuration has only one carrier set based on a carrier set indicated by the network device, the terminal device ignores the second switching indication information and determining a switching case corresponding to the carrier set indicated by the network device as a target switching case supporting the first antenna port configuration of the first carrier; or when the first information comprises the first switching indication information, if the second switching indication information indicates oneT, then the terminal device determines the target switching case of the first antenna port configuration of the first carrier based on the first switching indication information; or when the first information comprises the first switching indication information, if the second switching indication information indicates twoT, then the terminal device ignores the first switching indication information and determining the target switching case of the first antenna port configuration of the first carrier based on the second switching indication information.

7. The method according to claim 6, wherein, the first carrier and the second carrier belong to carriers on different frequency bands; and/or the first carrier and the second carrier use one port for signal transmission or data transmission.

8. The method according to claim 6, wherein the relationship set of the first carrier and the antenna port configuration is a subset of a full relationship set of carriers and antenna port configurations.

9. The method according to claim 6, wherein the first switching indication information comprises one of following:

a carrier index of the second carrier;

an absolute value of a difference between carrier indexes of the second carrier and the first carrier.

10. The method according to claim 6, wherein the full relationship set of the carriers and antenna port configurations comprises:

configured carrier sets corresponding to antenna port configurations in all switching cases under a quantity of bands used for switching.

11. A network device, comprising:

a memory, a transceiver, and a processor, wherein, the memory stores a computer program; the transceiver is configured to send and receive data under control of the processor; and the processor is configured to execute the computer program to perform steps of the method according to claim 6.

12. A terminal device, comprising:

a memory, a transceiver, and a processor, wherein, the memory stores a computer program; the transceiver is configured to send and receive data under control of the processor; and the processor is configured to execute the computer program to perform following operations:

when a quantity of switching bands is greater than 2 and an antenna port configuration of a first carrier that is to perform data transmission is a first antenna port configuration, determining a target switching case for the first antenna port configuration of the first carrier based on first information, wherein the first antenna port configuration is one port;

performing carrier switching according to the target switching case;

wherein the first information comprises:

a relationship set of a first carrier and antenna port configuration, wherein in switching cases for the first antenna port configuration of the first carrier within the relationship set of the first carrier and the antenna port configuration, there is only one carrier switching association relationship of a second antenna port configuration formed by a target carrier and the first carrier, the second antenna port configuration comprises an antenna port configuration of the target carrier and the first antenna port configuration, and the antenna port configuration of the target carrier is one port; or first switching indication information, wherein the first switching indication information is used to indicate a second carrier that constitutes a carrier switching association relationship with the first carrier;

wherein the first information further comprises second switching indication information, the second switching indication information is used to indicate data transmission using two ports, or data transmission using one port;

wherein the processor is further configured to read the computer program in the memory and perform following operations:

when the first information comprises the relationship set of the first carrier and the antenna port configuration, and when determining that the relationship set of the first carrier and the antenna port configuration has only one carrier set based on a carrier set indicated by the network device, ignoring the second switching indication information and determining a switching case corresponding to the carrier set indicated by the network device as a target switching case supporting the first antenna port configuration of the first carrier; or when the first information comprises the first switching indication information, if the second switching indication information indicates oneT, then determining the target switching case of the first antenna port configuration of the first carrier based on the first switching indication information; or when the first information comprises the first switching indication information, if the second switching indication information indicates twoT, then ignoring the first switching indication information and determining the target switching case of the first antenna port configuration of the first carrier based on the second switching indication information.

13. The terminal device according to claim 12, wherein, the first carrier and the second carrier belong to carriers on different frequency bands; and/or the first carrier and the second carrier use one port for signal transmission or data transmission.

14. The terminal device according to claim 12, wherein the processor is further configured to read the computer program in the memory and perform following operations:

receiving the relationship set, configured by a network device, of the first carrier and the antenna port configuration through the transceiver, when the first information comprises the relationship set of the first carrier and the antenna port configuration;

wherein the relationship set of the first carrier and the antenna port configuration is a subset of a full relationship set of carriers and antenna port configurations.

* * * * *